US009405788B2

(12) United States Patent
Kliewe

(10) Patent No.: US 9,405,788 B2
(45) Date of Patent: Aug. 2, 2016

(54) MASS DELETE RESTRICTION IN A DATABASE

(71) Applicant: International Business Machines Corporation, Armonk, NY (US)

(72) Inventor: John M. Kliewe, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 14/163,684

(22) Filed: Jan. 24, 2014

(65) Prior Publication Data

US 2015/0213078 A1 Jul. 30, 2015

(51) Int. Cl.
G06F 7/00 (2006.01)
G06F 17/30 (2006.01)
G06F 21/62 (2013.01)

(52) U.S. Cl.
CPC .... G06F 17/30371 (2013.01); G06F 17/30339 (2013.01); G06F 21/62 (2013.01)

(58) Field of Classification Search
CPC .............. G06F 21/62; G06F 17/30339; G06F 17/30371
See application file for complete search history.

(56) References Cited

U.S. PATENT DOCUMENTS

| 7,243,097 | B1* | 7/2007 | Agrawal et al. |
| 7,747,640 | B2 | 6/2010 | Dettinger et al. |
| 8,275,632 | B2 | 9/2012 | Awaraji et al. |
| 8,301,657 | B1 | 10/2012 | Coleman |
| 8,380,663 | B2 | 2/2013 | Thode |
| 8,386,533 | B2 | 2/2013 | Vendula et al. |
| 2005/0022000 | A1* | 1/2005 | Inomata et al. ............... 713/200 |
| 2006/0112093 | A1* | 5/2006 | Lightstone et al. ............... 707/5 |
| 2007/0288529 | A1 | 12/2007 | Ganesh et al. |
| 2011/0320419 | A1 | 12/2011 | Johnston et al. |

FOREIGN PATENT DOCUMENTS

| EP | 0507110 B1 | 9/1999 |
| EP | 1358579 B1 | 7/2010 |
| WO | 0113303 A1 | 2/2001 |
| WO | 0182118 A2 | 11/2001 |

OTHER PUBLICATIONS

Lindsay et al., "Notes on Distributed Databases", IP.com Prior Art Database Technical Disclosure, IPCOM000149869D, Apr. 11, 2007, 67 pp.

Qadah, Ghassan Zaki, "A Relational Database Machine Analysis and Design", IP.com Prior Art Database Technical Disclosure, IPCOM000151636D, Apr. 23, 2007, 517 pp.

* cited by examiner

Primary Examiner — Charles Lu
(74) Attorney, Agent, or Firm — Maeve Carpenter

(57) ABSTRACT

In an approach for limiting mass deletions from database tables, a computer receives a deletion request corresponding to data in a database table. The computer determines whether the database table includes a restriction of a mass deletion. Responsive to determining the database table includes a restriction of a mass deletion of data from a database table, the computer determines whether the quantity of data in the deletion request exceeds the restriction of a mass deletion. Responsive to determining the quantity of data in the deletion request exceeds the restriction of a mass deletion, the computer prevents execution of the deletion request.

15 Claims, 3 Drawing Sheets

MASS DELETE RESTRICTION IN A DATABASE

FIELD OF THE INVENTION

The present invention relates generally to the field of database management, and more particularly to restricting mass deletion in a database.

BACKGROUND OF THE INVENTION

Many business organizations have found that the importance and volume of business-critical records is rapidly increasing. Because of this, many companies are reevaluating their unstructured data strategy and are turning toward more reliable records management policies. "Records management" is the systematic and comprehensive control of the creation, capture, maintenance, filing, use, and disposition of records. Records management aims to ensure that records contained in a database are authentic and reliable, can be retrieved when needed as quickly and efficiently as possible, and are not destroyed prematurely or kept longer than required. A "record" is any data item (recorded information) that is under records management control and subject to a life cycle. A record's life cycle refers to the events happening to the record during its life span, from its creation or receipt to its final disposition. A record's life cycle is often described in three stages: creation, maintenance and use, and final disposition. A set of retention rules/policies are applied to the record over a defined time period.

Conventional database systems store data in the form of records or rows. Each row includes one or more related item(s) of information. For example, a row can include the date, number, amount and customer for an order. Certain groups of rows are organized into tables. For example, an Orders table can include all of the rows describing the characteristics of orders that have been received. Users of database systems manipulate and extract information from the tables and rows that make up the system. Such requests are conventionally referred to as queries. Queries can range in complexity from a request for the display of the information in a particular row, to an accumulation of data regarding rows and tables that comprise terabytes of information. Users of database systems also insert, delete, and update the information stored in the tables and rows.

SUMMARY

Embodiments of the present invention disclose a method, computer program product, and system for restricting mass deletions from database tables. A computer receives a deletion request corresponding to data in a database table. The computer determines whether the database table includes a restriction of a mass deletion. Responsive to determining the database table includes a restriction of a mass deletion of data from a database table, the computer determines whether the quantity of data in the deletion request exceeds the restriction of a mass deletion. Responsive to determining the quantity of data in the deletion request exceeds the restriction of a mass deletion, the computer prevents execution of the deletion request.

DETAILED DESCRIPTION

Figure 1:
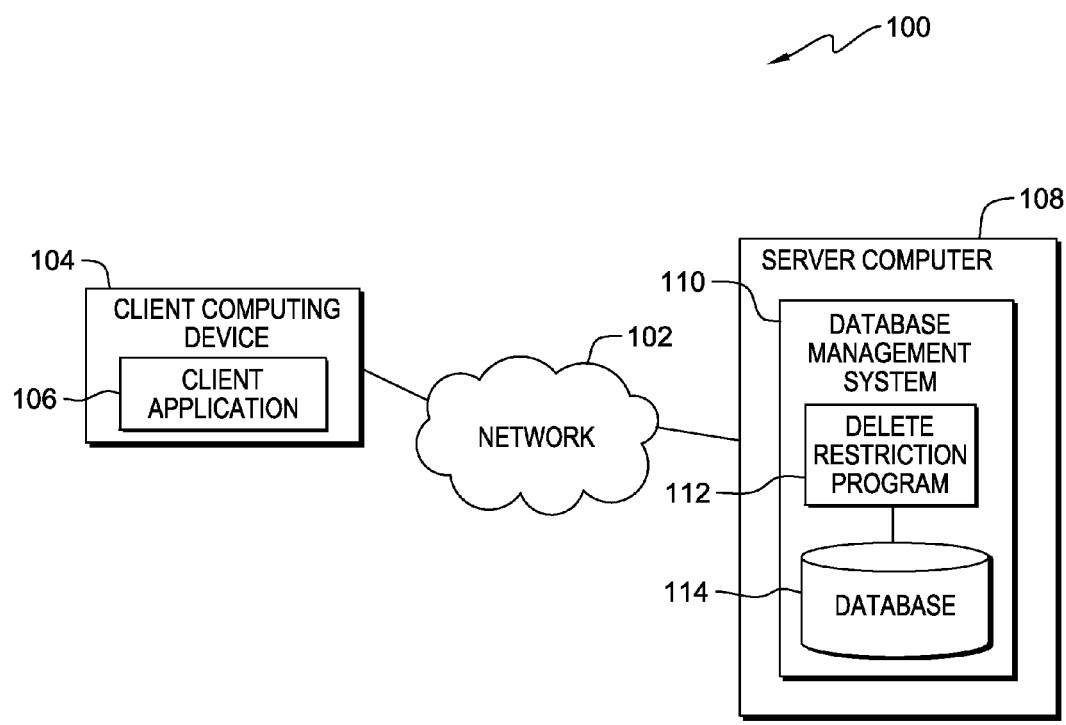
FIG. 1 is a functional block diagram illustrating a distributed data processing environment, in accordance with an embodiment of the present invention.

Data tables in a database management system (DBMS) are protected by security grants issued by the table owner. The owner can grant to a user the ability to delete records from the table. If a user has the ability to delete records from the table, there is no limit to the number of rows that a user can delete in a single statement. The user executes a request using a data manipulation language (DML), for example, a Structured Query Language (SQL) statement, to delete records from the table. If the user makes a fairly simple error in the SQL statement, the user can inadvertently delete all the records from the table.

Embodiments of the present invention recognize that data integrity can be maintained by restricting the number of rows that can be deleted from a database table by a user. Implementation of embodiments of the invention may take a variety of forms, and exemplary implementation details are discussed subsequently with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer or other programmable apparatus, provide processes for implementing the functions/acts specified in the flowchart and/or block diagram block or blocks.

Implementation of embodiments of the invention may take a variety of forms, and exemplary implementation details are discussed subsequently with reference to the figures. The embodiment illustrated in the figures describes the interaction of a relational database and query statements, using SQL as the query language. Specific details disclosed herein are not to be interpreted as limiting, but merely as a representative basis for teaching one skilled in the art to variously employ the methods and structures of the present disclosure. Embodiments of the present invention may apply to all database types, including but not limited to relational, hierarchical, network, and object-oriented databases. Likewise, embodiments of the present invention may apply to other query languages, including but not limited to SQL, QUEL, OQL, and SEQUEL.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108, all interconnected over network 102. Network 102 can be, for example, a local area network (LAN), a wide area network (WAN) such as the Internet, or a combination of the two, and can include wired, wireless, or fiber optic connections. In general, network 102 can be any combination of connections and protocols that will support communications between client computing device 104 and server computer 108.

Client computing device 104 may be a desktop computer, a laptop computer, a tablet computer, a specialized computer server, a smart phone, or any programmable electronic device capable of communicating with server computer 108 via network 102 and with various components and devices within distributed data processing environment 100. In general, client computing device 104 represents any programmable electronic device or combination of programmable electronic devices capable of executing machine-readable program instructions and communicating with other computing devices via a network, such as network 102. Client computing device 104 includes client application 106.

Client application 106 resides on client computing device 104. Client application 106 is any application or program that a user employs to submit a query to server computer 108. A query is a request for data stored in tables in a database management system (DBMS). Queries allow the user to describe desired data, leaving the DBMS responsible for planning, optimizing, and performing the physical operations necessary to produce that result. A query includes a list of columns to be included in the final result. Queries are typically written in a data manipulation language such as Structured Query Language (SQL), a special-purpose programming language designed for managing data held in a DBMS. SQL includes a data definition language (DDL) and a data manipulation language (DML). The scope of SQL includes data insert, query, update and delete, schema creation and modification, and data access control.

Server computer 108 may be a management server, a web server, or any other electronic device or computing system capable of receiving and sending data. In other embodiments, server computer 108 may represent a server computing system utilizing multiple computers as a server system, such as in a cloud computing environment. In another embodiment, server computer 108 may be a laptop computer, tablet computer, netbook computer, personal computer (PC), a desktop computer, a personal digital assistant (PDA), a smart phone, or any programmable electronic device capable of communicating with client computing device 104 via network 102. In another embodiment, server computer 108 represents a computing system utilizing clustered computers and components to act as a single pool of seamless resources. Server computer 108 includes database management system 110 and database 114. Server computer 108 may include internal and external hardware components, as depicted and described in further detail with respect to FIG. 3.

Database management system (DBMS) 110 resides on server computer 108. A DBMS is a program or group of programs that work in conjunction with the operating system to create, process, store, retrieve, control and manage data. It acts as an interface between the application program and the data stored in a database. The objective of a DBMS is to provide a convenient and effective method of defining, storing, and retrieving the information stored in the database. When the DBMS receives a query, the query specifies the data that the user wants, but not how to get to that data. DBMS 110 includes delete restriction program 112.

Delete restriction program 112 resides within DBMS 110. In an embodiment of the present invention, delete restriction program 112 provides a table owner with the ability to define a delete restriction for the table. When the table is created, the table owner can specify that deletions from the table are restricted to a particular quantity of rows at a time. The table owner provides a threshold value that indicates the maximum quantity of rows that may be deleted by a statement or a query. For example, at table create time, the table owner provides a "DELETION RESTRICTED TO x ROWS" statement, where x represents an integer value that indicates the threshold value. The x value is stored in the database metadata catalog, along with all other table metadata. In the event that a user runs an SQL query that will delete more than x rows, delete restriction program 112 causes the SQL statement to fail. For example, a table owner can specify that deletion of more than 1000 rows at a time is not allowed. A careless user is then prevented from deleting more than 1000 rows with one statement.

Database 114 resides on server computer 108. A database is an organized collection of data. Database 114 may be a relational or non-relational database. Examples of relational databases include DB2®, MySQL®, and Oracle®. Examples of non-relational databases include HBase, MongoDB®, and OrientDB®. Typically a database used by a DBMS is organized into tables with data being recognized by a row/column location. Database 114 stores the data that is accessed and managed by DBMS 110. In one embodiment, database 114 also includes the manual of SQLCODEs that are displayed as diagnostic messages when an SQL statement fails. In addition, database 114 may include a metadata catalog defined by a table owner for each table. The metadata catalog may include instructions and restrictions with respect to access of the table.

Figure 2:
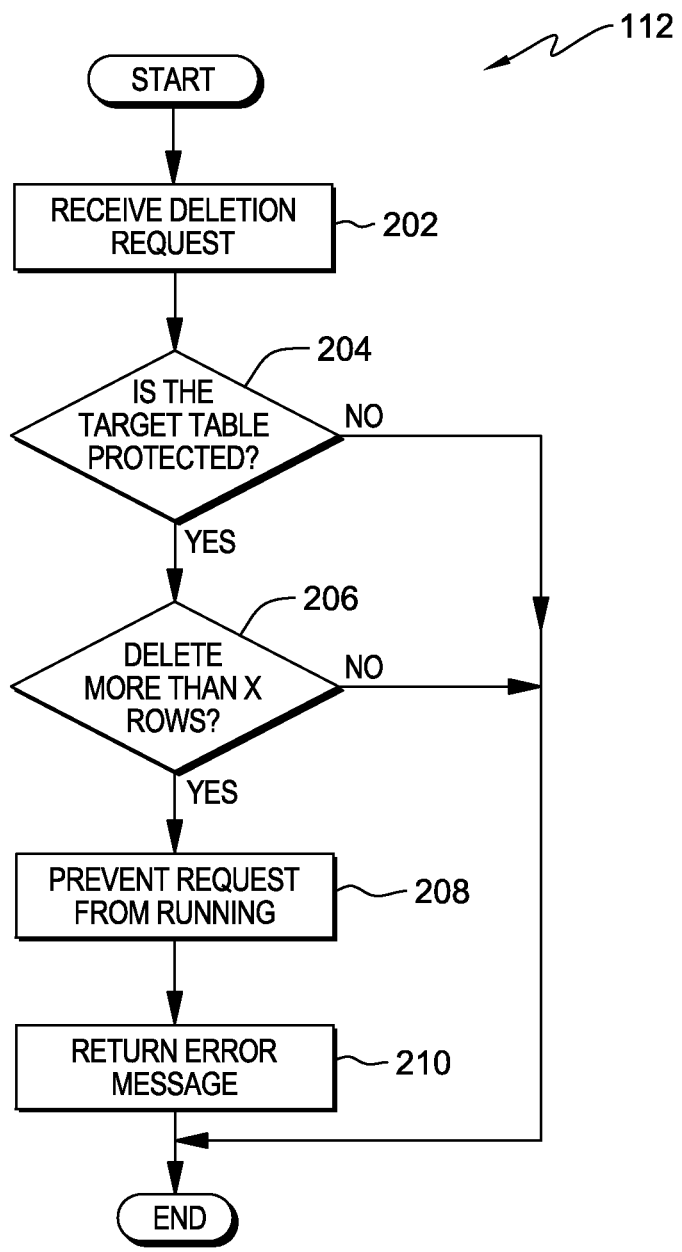
FIG. 2 is a flowchart depicting operational steps of a delete restriction program, on a server computer within the distributed data processing environment of FIG. 1, for restricting a mass deletion, in accordance with an embodiment of the present invention.

FIG. 2 is a flowchart depicting operational steps of delete restriction program 112, on server computer 108 within distributed data processing environment 100 of FIG. 1, for restricting a mass deletion, in accordance with an embodiment of the present invention. An exemplary embodiment of delete restriction program 112 is presented, where delete restriction program 112 interacts with database 114, which is a relational database, and where SQL is the DML of choice.

Delete restriction program 112 receives a deletion request (step 202). In one embodiment, delete restriction program 112 receives a query from client application 106. For example, a user of client computing device 104 may cause client application 106 to send a query to database 114 via an SQL statement. The query includes a request to delete a number of rows of data from a target table in database 114. For example, a user may request that all rows that begin with the letter "a" are deleted from the table in database 114.

Delete restriction program 112 determines whether the target table is protected by a delete restriction (decision block 204). Delete restriction program 112 reviews a metadata catalog for the table from which the user is requesting a deletion to determine whether the table owner has specified a limit to the number of deletions that can be made from the table at one time. In one embodiment, the table owner has protected the table by providing a "DELETION RESTRICTED TO x ROWS" statement. If the target table is not protected (no branch, decision block 204), delete restriction program 112 allows the deletion (not shown) and ends execution.

If the target table is protected (yes branch, decision block 204), delete restriction program 112 determines whether the request is to delete more than x rows, where x is threshold value (decision block 206). In one embodiment, the threshold value is an integer. For example, if a user requests to delete all rows that begin with the letter "a", and the table owner has provided a statement such as "DELETION RESTRICTED TO 1000 ROWS" in the table metadata catalog, delete restriction program 112 determines whether the number of rows that start with the letter "a" exceeds 1000. In another embodiment, the threshold value may be a percentage. For example, if a user requests to delete all rows that begin with the letter "a", and the table owner has provided a statement to limit deletions to ten percent of the rows in the table, delete restriction program 112 determines whether the number of rows that start with the letter "a" exceeds ten percent of the rows in the table.

If the user requests to delete x rows or less (no branch, decision block 206), delete restriction program 112 allows the deletion (not shown) and ends execution. If the user requests to delete more than x rows (yes branch, decision block 206), delete restriction program 112 prevents the request from running (step 208). In the previous example, if delete restriction program 112 determines that the number of rows that starts with the letter "a" is 2000, and the table owner has defined x as 1000, then delete restriction program 112 prevents the deletion request from running.

Delete restriction program 112 returns an error message, for example, a negative SQLCODE (step 210). SQL Return Codes are used for the diagnosis of programming failures. The error diagnostic containing the SQL Return Code is held in the field SQLCODE within the database. The SQLCODE field contains the SQL return code. The code can be zero (0), negative or positive. If the user requests to delete more than x rows, delete restriction program 112 can return a negative SQLCODE that indicates the request has failed. The negative SQLCODE returned by delete restriction program 112 is defined in database 114 as part of the SQLCODE manual. In another embodiment, the table owner may define a customized error message. For example, the table owner may code an SQL message to read "deletion request exceeds row limit" so that the user understands why the deletion request failed.

In one embodiment, when a user needs to delete more than x rows, the user can request, prior to sending a query to database 114 via DBMS 110, that the table owner either temporarily or permanently change the delete restriction. The table owner can change the delete restriction by issuing an ALTER command. For example, a user may have a legitimate need to delete one million rows from a table; however the delete restriction is set at 1000 rows. The user can contact the table owner and request that the table owner suspend the restriction for a defined, brief period of time. The table owner issues an ALTER statement to allow the larger deletion. Upon completion of the user's deletion, the table owner returns the delete restriction to the original setting.

In another embodiment, when the table owner needs to delete more than x rows, the table owner can remove the restriction by executing a DDL command, such as "ALTER TABLE mytable REMOVE DELETE RESTRICTION". Once the DDL command is complete, the table owner can run the delete via SQL. Once the delete is complete, the table owner uses another DDL command to put the restriction back on the table. Due to the process of taking two separate actions, the table owner is less likely to make a mass delete error.

Figure 3:
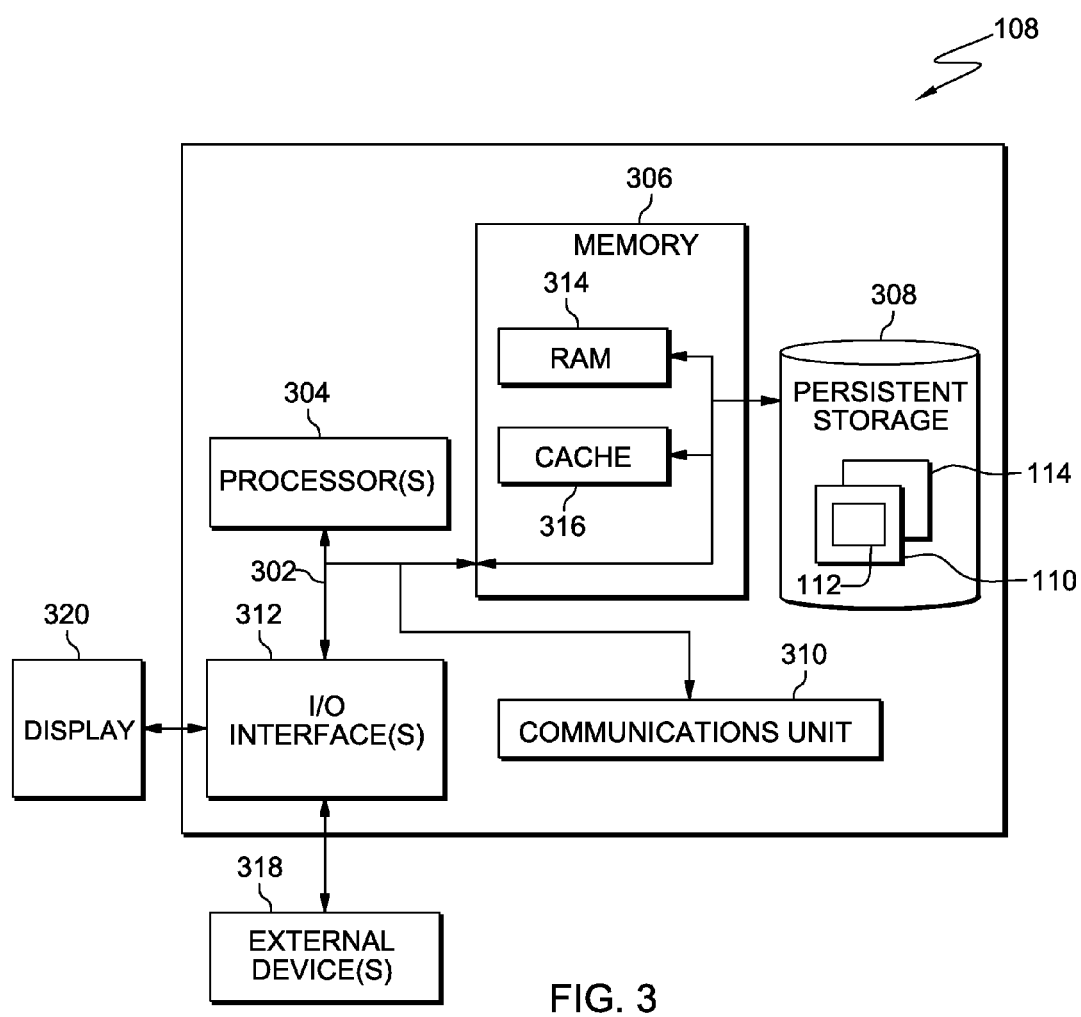
FIG. 3 depicts a block diagram of components of the server computer executing the database management system, in accordance with an embodiment of the present invention.

FIG. 3 depicts a block diagram of components of server computer 108 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 108 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Database management system 110, delete restriction program 112 and database 114 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including client computing device 104. In these examples, communications unit 310 includes one or more network interface cards. Communications unit 310 may provide communications through the use of either or both physical and wireless communications links. Database management system 110, delete restriction program 112, and database 114 may be downloaded to persistent storage 308 through communications unit 310.

I/O interface(s) 312 allows for input and output of data with other devices that may be connected to server computer 108. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., database management system 110, delete restriction program 112, and database 114, can be stored on such portable computer-readable storage media and can be loaded onto persistent storage 308 via I/O interface(s) 312. I/O interface(s) 312 also connects to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for limiting mass deletions from database tables, the method comprising:
 a computer receiving a deletion request from a user corresponding to data in a database table;
 the computer determining whether the database table includes a restriction of a mass deletion of data from the database table, wherein the restriction of a mass deletion is one that specifies a threshold quantity of rows in the database table;
 the computer receiving a request from the user to remove the mass deletion restriction on the database table;
 the computer, responsive to determining the database table includes a restriction of a mass deletion of data from the database table, determining whether a number of rows of data in the deletion request exceeds the restriction of a mass deletion; and
 the computer, responsive to receiving the request from the user to remove the mass deletion restriction, receiving a command from an owner of the database table to suspend the mass deletion restriction.

2. The method of claim 1, further comprising, responsive to determining the database table does not include a restriction of a mass deletion, the computer allowing execution of the deletion request.

3. The method of claim 1, further comprising, responsive to determining the number of rows of data in the deletion request does not exceed the restriction of a mass deletion, the computer allowing execution of the deletion request.

4. The method of claim 1, wherein the restriction of a mass deletion is defined by a database table owner at a time the database table is created.

5. The method of claim 1, wherein the restriction of a mass deletion is one that specifies a threshold percentage of rows in a database table.

6. The method of claim 1, wherein the computer receiving a command from an owner of the database table to suspend the mass deletion restriction further comprises the computer receiving a data definition language (DDL) command.

7. A computer program product for limiting mass deletions from database tables, the computer program product comprising:
   one or more computer-readable storage media and program instructions stored on the one or more computer-readable storage media, the program instructions comprising:
   program instructions to receive a deletion request from a user corresponding to data in a database table;
   program instructions to determine whether the database table includes a restriction of a mass deletion of data from the database table, wherein the restriction of a mass deletion is one that specifies a threshold quantity of rows in the database table;
   program instructions to receive a request from the user to remove the mass deletion restriction on the database table;
   responsive to determining the database table includes a restriction of a mass deletion of data from the database table, program instructions to determine whether a number of rows of data in the deletion request exceeds the restriction of a mass deletion; and
   responsive to receiving the request from the user to remove the mass deletion restriction, program instructions to receive a command from an owner of the database table to suspend the mass deletion restriction.

8. The computer program product of claim 7, further comprising, responsive to determining the database table does not include a restriction of a mass deletion, program instructions to allow execution of the deletion request.

9. The computer program product of claim 7, further comprising, responsive to determining the number of rows of data in the deletion request does not exceed the restriction of a mass deletion, program instructions to allow execution of the deletion request.

10. The computer program product of claim 7, wherein the restriction of a mass deletion is defined by a database table owner at a time the database table is created.

11. The computer program product of claim 7, wherein the restriction of a mass deletion is one that specifies a threshold percentage of rows in a database table.

12. A computer system for limiting mass deletions from database tables, the computer system comprising:
   one or more computer processors;
   one or more computer-readable storage media;
   program instructions stored on the computer-readable storage media for execution by at least one of the one or more processors, the program instructions comprising:
   program instructions to receive a deletion request from a user corresponding to data in a database table;
   program instructions to determine whether the database table includes a restriction of a mass deletion of data from the database table, wherein the restriction of a mass deletion is one that specifies a threshold quantity of rows in the database table;
   program instructions to receive a request from the user to remove the mass deletion restriction on the database table;
   responsive to determining the database table includes a restriction of a mass deletion of data from the database table, program instructions to determine whether a number of rows of data in the deletion request exceeds the restriction of a mass deletion; and
   responsive to receiving the request from the user to remove the mass deletion restriction, program instructions to receive a command from an owner of the database table to suspend the mass deletion restriction.

13. The computer system of claim 12, further comprising, responsive to determining the database table does not include a restriction of a mass deletion, program instructions to allow execution of the deletion request.

14. The computer system of claim 12, further comprising, responsive to determining the number of rows of data in the deletion request does not exceed the restriction of a mass deletion, program instructions to allow execution of the deletion request.

15. The computer system of claim 12, wherein the restriction of a mass deletion is one that specifies a threshold percentage of rows in a database table.

\* \* \* \* \*